United States Patent
Nilsson et al.

(10) Patent No.: US 11,233,409 B2
(45) Date of Patent: Jan. 25, 2022

(54) ARRANGEMENT AND A METHOD FOR CONTROLLING A DISCONNECTOR IN A MOTOR VEHICLE

(71) Applicant: Scania CV AB, Södertälje (SE)

(72) Inventors: Börje Nilsson, Bromma (SE); Gunnar Ledfelt, Nykvarn (SE); Thomas Lagerlund, Tullinge (SE); Jean-Baptiste Billot, Poisy (FR)

(73) Assignee: Scania CV AB, Södertälje (SE)

( * ) Notice: Subject to any disclaimer, the term of this patent is extended or adjusted under 35 U.S.C. 154(b) by 28 days.

(21) Appl. No.: 16/765,905

(22) PCT Filed: Nov. 12, 2018

(86) PCT No.: PCT/SE2018/051152
§ 371 (c)(1),
(2) Date: May 21, 2020

(87) PCT Pub. No.: WO2019/108107
PCT Pub. Date: Jun. 6, 2019

(65) Prior Publication Data
US 2020/0313447 A1  Oct. 1, 2020

(30) Foreign Application Priority Data

Nov. 30, 2017 (SE) .................... 1751477-9

(51) Int. Cl.
*H02J 7/00* (2006.01)
*B60R 16/03* (2006.01)
*B60R 16/04* (2006.01)

(52) U.S. Cl.
CPC ............ *H02J 7/0031* (2013.01); *B60R 16/03* (2013.01); *B60R 16/04* (2013.01); *H02J 7/0032* (2013.01); *H02J 2310/46* (2020.01)

(58) Field of Classification Search
CPC .... H02J 7/0031; H02J 7/0032; H02J 2310/46; B60R 16/03; B60R 16/04
(Continued)

(56) References Cited

U.S. PATENT DOCUMENTS

2008/0079389 A1  4/2008 Howell et al.
2012/0286729 A1* 11/2012 Yegin .................. B60L 3/04
320/109

(Continued)

FOREIGN PATENT DOCUMENTS

| CN | 104868511 A | 8/2015 |
| EP | 2184827 A1 | 5/2010 |
| JP | H10181381 A | 7/1998 |

OTHER PUBLICATIONS

Scania CV AB, International Application No. PCT/SE2018/051152, International Search Report, dated Jan. 29, 2019.
(Continued)

*Primary Examiner* — Zixuan Zhou
(74) *Attorney, Agent, or Firm* — Moore & Van Allen PLLC; W. Kevin Ransom

(57) ABSTRACT

An arrangement for controlling a disconnector arranged between power batteries and a consumer side of an electric system of a motor vehicle comprises a maneuver switch to be manually operated and configured to connect a control unit for the control of the disconnector to a conducting line on the battery side of the disconnector. The maneuver switch is configured to in a first position by movable contact members thereof connect each of two fixed output contacts to a different of two fixed input contacts than in a second position. A parameter is sensed on at least one input line from the maneuver switch to the control unit for determining which of the first and second position is assumed by the maneuver switch.

17 Claims, 5 Drawing Sheets

(58) Field of Classification Search
USPC .............................................. 320/109; 701/22
See application file for complete search history.

(56) References Cited

U.S. PATENT DOCUMENTS

| | | | |
|---|---|---|---|
| 2013/0148251 A1* | 6/2013 | Iwashita | ................ B60L 53/60 361/170 |
| 2016/0059806 A1 | 3/2016 | Thömmes et al. | |
| 2016/0152140 A1 | 6/2016 | Cepynsky et al. | |
| 2018/0186241 A1* | 7/2018 | Harvey | ................ B60L 3/0046 |

OTHER PUBLICATIONS

Scania CV AB, International Application No. PCT/SE2018/051152, Written Opinion, dated Jan. 29, 2019.
Scania CV AB, International Application No. PCT/SE2018/051152, International Preliminary Report on Patentability, dated Jun. 2, 2020.
Scania CV AB, European Patent Application No. 18884115.9, Extended European Search Report, dated Aug. 3, 2021.

* cited by examiner

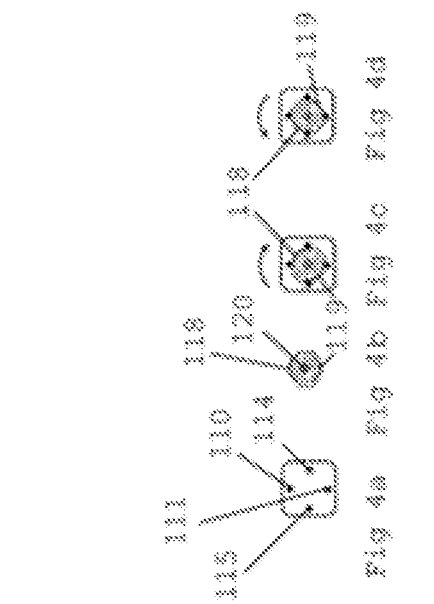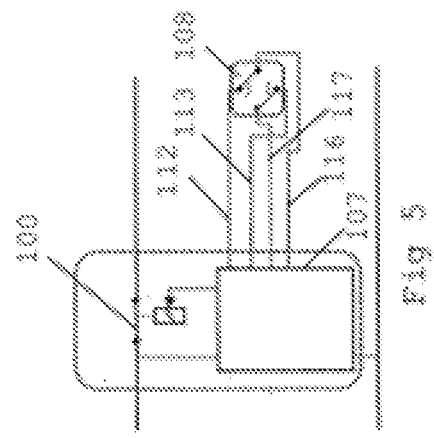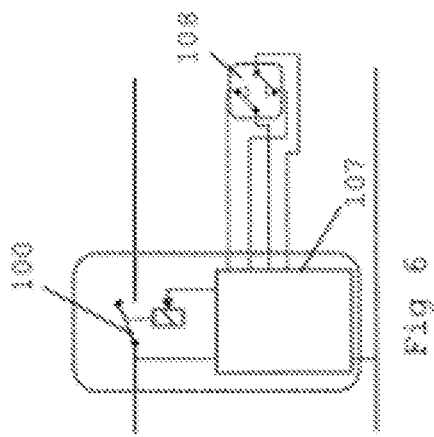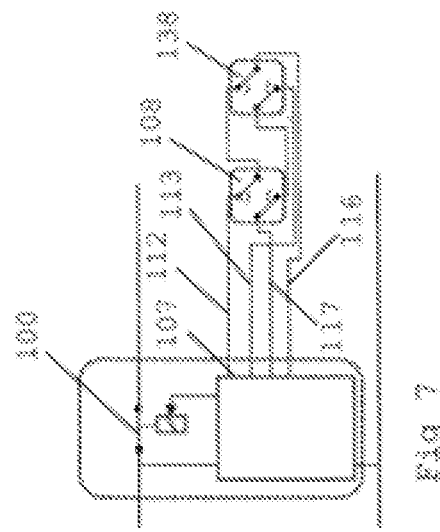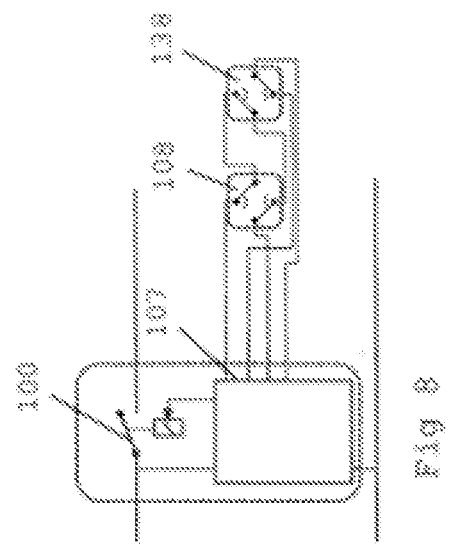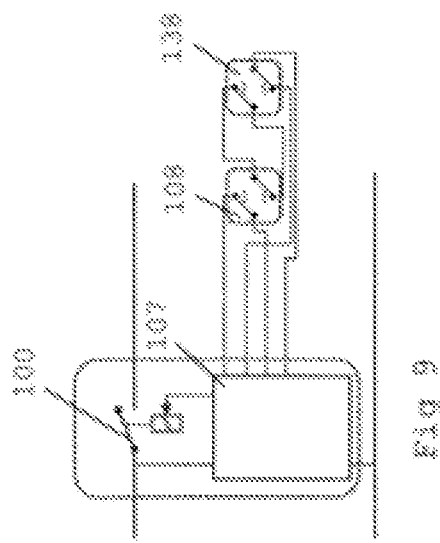

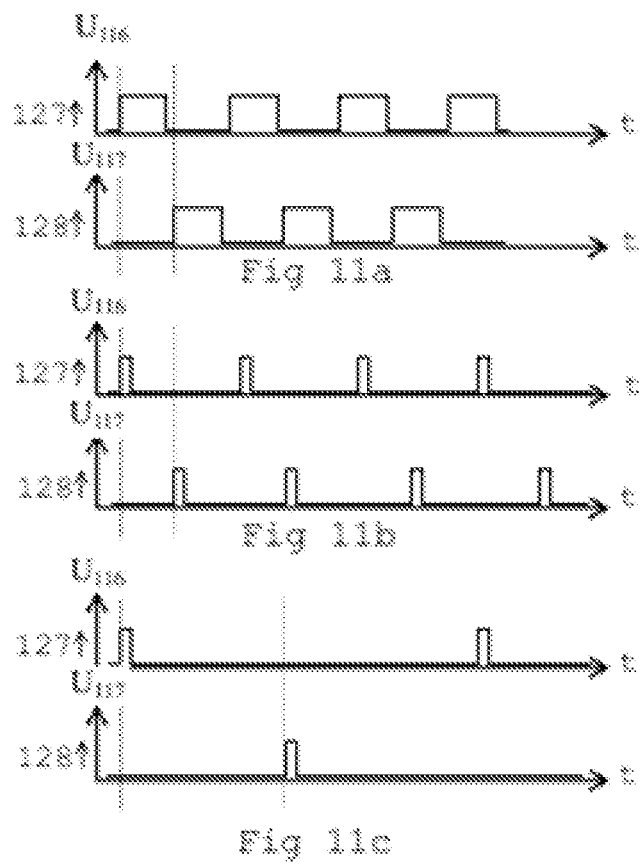
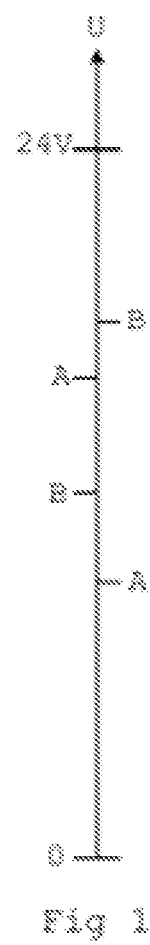
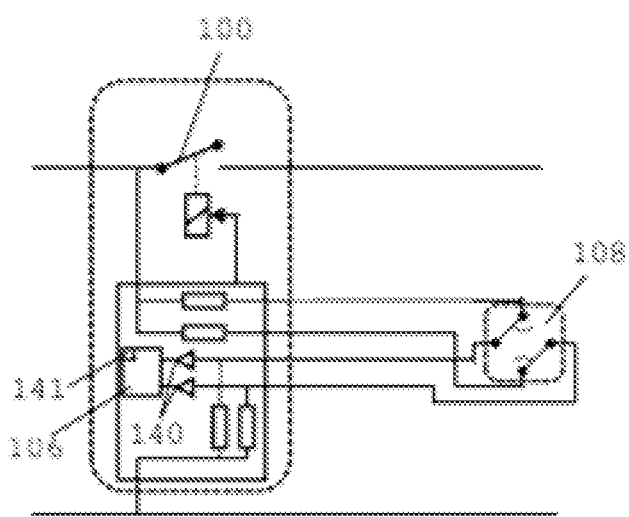

ARRANGEMENT AND A METHOD FOR CONTROLLING A DISCONNECTOR IN A MOTOR VEHICLE

CROSS-REFERENCE TO RELATED APPLICATIONS

This application is a national stage application (filed under 35 § U.S.C. 371) of PCT/SE2018/051152, filed Nov. 12, 2018 of the same title, which, in turn, claims priority to Swedish Application No. 1751477-9 filed Nov. 30, 2017; the contents of each of which are hereby incorporated by reference.

FIELD OF THE INVENTION

The present invention relates to an arrangement for controlling a disconnector arranged between power batteries and a consumer side of an electric system of a motor vehicle as well as a method for controlling such a disconnector.

BACKGROUND OF THE INVENTION

In motor vehicles, especially wheeled heavy motor vehicles, such as trucks and buses, a disconnector in the form of a so-called battery master switch can be arranged between power batteries of the electric system of the motor vehicle and a consumer side of the electric system so as to provide a possibility to disconnect the power batteries from the rest of the electric system. Furthermore, known arrangements for controlling the disconnector are provided with a maneuver switch to be manually operated for manually controlling the disconnector by the driver of the vehicle or a mechanic when the vehicle stands still. By opening and closing the maneuver switch the disconnector will be opened and closed, respectively. The reasons for operating the maneuver switch to open the disconnector may be to either protect the motor vehicle from the batteries or protect the batteries from the motor vehicle. When using the motor vehicle for transport of some dangerous goods the driver may have to disconnect the batteries for avoiding any risk of sparking, for example when a fuel transport vehicle is filled in a fuel depot. Furthermore, when work is carried out on the electric system of the motor vehicle, the electrician/mechanic may wish to disconnect the batteries for avoiding risk for damaging the electric system in the case of occurrence of short circuits. By opening said disconnector the batteries may be protected from the motor vehicle by avoiding that the batteries are discharged as a consequence of an unintentional power consumption of consumers connected to the electric system.

FIGS. 1-3 show schematically known arrangements for controlling a said disconnector 1 arranged between power batteries 2 and a consumer side 3 with consumers 4 of the electric system 5 of a motor vehicle. The disconnector 1 is a bi-stabile solenoid controlled by a control unit in the form of a micro controller 6 arranged on a printed circuit board 7. Orders to open or close the disconnector are sent to the control unit 6 by controlling a maneuver switch 8. By introducing two sets of conducting paths 9, 10 including two pole maneuver switches the risk for unintended opening of the disconnector in case of a single failure on one of the conductive paths is lowered. Under the design choice that an open maneuver switch dominates over a closed maneuver switch, it is possible to connect a second maneuver switch 11 in series with a first maneuver switch 8 as shown in FIG. 2, so that the disconnector may be manually controlled by the driver or any other pertinent person at two different locations, such as in the driver cabin and at a location outside the cabin. However, in this known arrangement it is not possible to distinguish between intentionally open conducting paths 9, 10 by an opening of one said maneuver switch and faults where both said conducting paths are broken, such as a consequence of damaged maneuvering switches, connector breakdowns, cable cuts etc. Although some short time delays may be used in the known arrangement shown to further prevent the disconnector to be opened in case of simultaneous micro-cuts in both maneuvering circuits, the risk of losing electric power in the electric system of the motor vehicle unintentionally during driving is still there as a consequence of said lack of ability to distinguish between an intention to open the disconnector and the occurrence of a said fault. This may lead to dangerous situations, for instance when loosing electric power to head lamps of the vehicle in darkness.

SUMMARY OF THE INVENTION

An object of the present invention is to provide an arrangement of the type defined above able to address the problem mentioned above of such known arrangements.

This object is according to the invention obtained by providing an arrangement for controlling a disconnector arranged between power batteries and a consumer side of an electric system of a motor vehicle, in which the electric system comprises at least one power battery, a said disconnector arranged in a conducting line from said power battery to said consumer side and a unit configured to control the disconnector to close or open said conducting line through the disconnector, the arrangement comprising at least one maneuver switch to be manually operated and configured to connect said control unit to said conducting line on a battery side of the disconnector, said maneuver switch comprising two fixed output contacts each configured to be connected through an output line to said conducting line on the battery side of the disconnector, two fixed input contacts each configured to be connected through an input line to said control unit, and two movable contact members movable between a first position of sending a disconnector closing order to the control unit and a second position of sending a disconnector opening order to the control unit, which arrangement is characterized in that the maneuver switch is configured to in said first position by said movable contact members connect each fixed output contact to a different of said two fixed input contacts than in the second position, and that the arrangement comprises a member configured to sense at least one parameter on at least one of said input lines from said maneuver switch to the control unit and a device configured to, on the basis of the result of this sensing action, determine which of said first and second position is assumed by the maneuver switch and inform the control unit of the order so given thereto by the maneuver switch.

By sensing a said parameter on at least one of the input lines from the maneuver switch to the control unit in combination with the design of the maneuver switch to have a different of the two fixed input contact connected to each fixed output contact in the two possible states of opening and closing of the maneuvering switch, it will be possible to distinguish between intentionally operating the maneuver switch to open the disconnector and faults in the conducting paths made by the output lines and the input lines to the maneuver switch. Thus, it may be avoided to open the disconnector when said faults occur and the maneuver switch is closed, since such faults will not result in the same result of a sensing of a said parameter as in the case of an open maneuver switch. This means that said dangerous situations may be avoided. Accordingly, it may then be ensured that the disconnector is only open if a result of the sensing action of the sensing device corresponds to a result expected for an open maneuver switch avoiding an unintentional opening of the conducting path between the power batteries of the vehicle and the rest of the electric system of the vehicle.

The invention also relates to a method for controlling a disconnector arranged between power batteries and a consumer side of an electric system of a motor vehicle, in which the electric system comprises at least one power battery, a said disconnector arranged in a conducting line from said power battery to said consumer side, a unit configured to control the disconnector to close or open said conducting line through the disconnector and a maneuver switch to be manually operated and configured to connect said control unit to said conducting line on a battery side of the disconnector, in which the maneuver switch comprises two fixed output contacts each configured to be connected through an output line to said conducting line on the battery side of the disconnector, two fixed input contacts each configured to be connected to an input line to a said control unit and two movable contact members movable between a first position of sending a disconnector closing order to the control unit and a second position of sending a disconnector opening order to the control unit, characterized in that the method is carried out for a maneuver switch configured to in said first position by said movable contact members connect each fixed output contact to a different of said two fixed input contacts than in the second position, and that the method comprises the steps carried out in the order mentioned a) sensing at least one parameter on at least one of said input lines from said maneuver switch to the control unit, b) determining which of said first and second position is assumed by the maneuver switch on the basis of the result of said sensing action, and c) informing the control unit of the order given thereto by the maneuver switch.

By carrying out this method it may be distinguished between intentionally operating the maneuver switch to open the disconnector and faults where said conducting paths connecting to the maneuver switch are damaged.

The invention also relates to a computer program comprising a computer program code for causing a computer to implement a method according to the invention when the computer program is executed in the computer as well as a computer program product comprising a non-transitory data storage medium which can be read by a computer and on which the program code of such a computer program is stored.

Furthermore, the invention relates to an electronic control unit of a motor vehicle comprising an execution means, a memory connected to the execution means and a non-transitory data storage medium which is connected to the execution means and on which the computer program code of a said computer program is stored.

The invention also relates to a motor vehicle, especially a wheeled vehicle such as a truck or a bus, which comprises an arrangement and/or an electronic control unit according to the invention.

Further advantages as well as advantageous features of the invention will appear from the description following below.

BRIEF DESCRIPTION OF THE DRAWINGS

With reference to the appended drawings, below follows a detailed description of embodiments of the invention cited as examples.

In the drawings:

FIGS. 4a-4d are schematic views illustrating a possible structure of a maneuver switch in an arrangement according to the present invention, FIGS. 5 and 6 are schematic views illustrating an arrangement according to an embodiment of the invention with the maneuver switches thereof in a closing and an opening position, respectively, FIGS. 7-9 are schematic views of an arrangement according to another embodiment of the present invention having two maneuver switches and showing these maneuver switches in different states, FIGS. 11a-11c are graphs of voltage versus time on the two input lines to the control unit in the arrangement according to the embodiment shown in FIG. 10 with the maneuver switch in closed state and while carrying out methods for checking this state, FIG. 13 is a view of the arrangement shown in FIG. 12 with the maneuver switch in open state, FIG. 14 is a graph of voltage levels on input lines to the control unit in the arrangement shown in FIGS. 12 and 13 in the two different states of the maneuver switch shown there.

DETAILED DESCRIPTION OF EMBODIMENTS OF THE INVENTION

Figure 1:
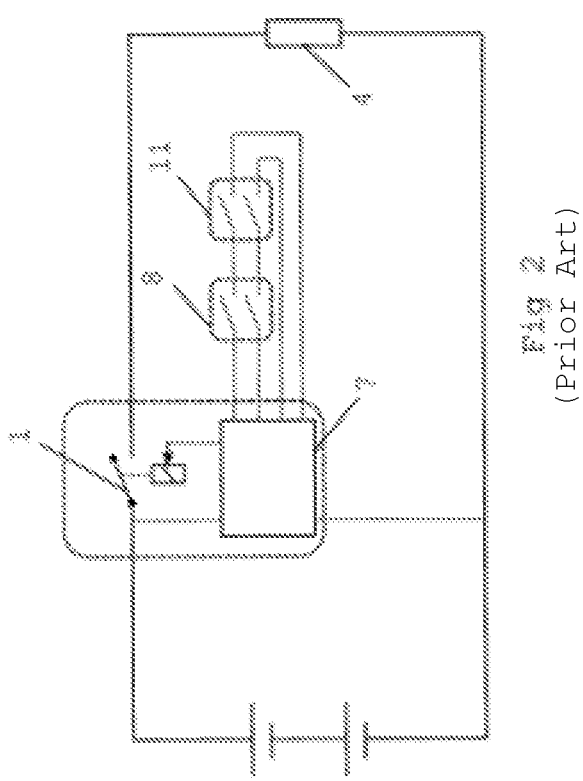
FIGS. 1-3 are schematic views illustrating the structure of a known arrangement of the type to which the invention is directed.
Figure 2:
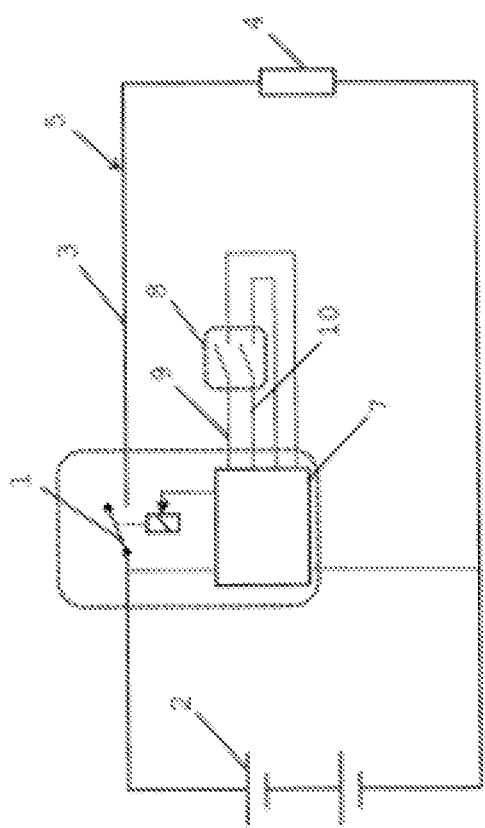
Figure 3:
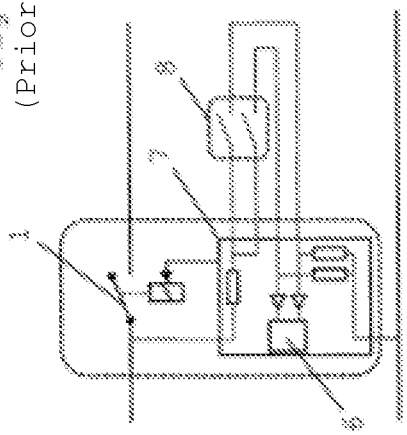

An arrangement for controlling a disconnector 100 arranged between power batteries 101 and a consumer side 102 of an electric system 103 of a motor vehicle 104 according to an embodiment shown in FIG. 10 will now be described while simultaneously making reference to FIGS. 4a-d, FIG. 5 and FIG. 6. The disconnector 100 is arranged in a conducting line 105 from the power batteries 101 to the consumer side 102. A control unit 106 in the form of a micro controller is arranged on a printed circuit board 107 and configured to control the disconnector to close or open the conducting line 105 through the disconnector.

The arrangement has a maneuver switch 108 to be manually operated and configured to connect the control unit 106 to the conducting line 105 on a battery side 109 of the disconnector 100. This maneuver switch comprises (see also FIGS. 4a-d) two fixed output contacts 110, 111 each configured to be connected through an output line 112, 113 to said conducting line on the battery side of the disconnector. The maneuver switch has also two fixed input contacts 114, 115 each configured to be connected through an input line 116, 117 to the control unit 106. The maneuver switch has besides that two movable contact members 118, 119 having an arc-like shape and being secured to a body 120 to be rotated for making each contact member bridging a space between different two said fixed contacts 110, 111, 114, 115, which are arranged along a circle-like path, for moving the maneuver switch between the two positions shown in FIGS. 4c and 4d. These are a first position, which is shown in FIG. 4c, FIG. 5, FIG. 10 and FIG. 12, of sending a disconnector closing order to the control unit 106 and a second position, which is shown in FIG. 4d, FIG. 6 and FIG. 13, of sending a disconnector opening order to the control unit. Accordingly, this means that the maneuver switch 106 will in said first position by the movable contact members 118, 119 connect each fixed output contact to a different of said two fixed input contacts than in the second position.

A first resistor 121 is arranged in the output lines 112, 113 connected through the conducting line 105 to a first pole of +24V of the power batteries in the case of two 12V power batteries 101 connected in series. This resistor is acting as a current limiter. The arrangement further comprises two second resistors 122, 123 arranged in a conducting line 124 connecting the input lines 116, 117 to a second pole 125 of the power batteries opposite to the first pole 126. The second resistors are here arranged for making the control unit less sensitive to noises.

A normally-off semiconductor switch 127, 128 is arranged in each output line 112, 113. A member, very schematically indicated in the figures by triangular arrows 140 on the digital input of the respective control unit, is configured to sense at least one parameter on at least one of the input lines from the maneuver switch to the control unit and a device 141, which preferably is built in as a part of the control unit 106 in the software thereof, is configured to on the basis of the result of the sensing action determine which of said first and second position is assumed by the maneuver switch and inform the control unit of the order so given thereto by the maneuver switch. This device 141 is here configured to control said sensing member 140 to carry out said sensing action by controlling the semiconductor switches 127, 128 to be temporarily turned on to sense the voltage pulses resulting thereby on the input lines 116, 117. It may by this be determined which of said first and second position is assumed by the maneuver switch. How this is obtained will now be described by making reference also to FIGS. 11a-c. It is shown what happens with the voltage U on the input line 116 when the semiconductor switch 127 is turned on and on the input line 117 when the semiconductor switch 128 is turned on. It is shown in FIG. 11a how the semiconductor switch 128 is turned on with a slight time delay after the turning off the semiconductor switch 127, so that the voltage pulses so obtained will not be disturbed by varying currents through the current limiter resistor 121. The voltage pulses so obtained show that the fixed contacts 110 and 114 has to be connected to each other and that the same apply to the fixed contacts 111, 115, and accordingly that the maneuver switch 108 has to be in the position shown in FIGS. 5 and 10. Would instead the maneuver switch be turned to the position shown in FIGS. 4d and 6 there will be a voltage pulse on the input line 117 when the semiconductor switch 127 is turned on and a voltage pulse on the input line 116 when the semiconductor switch 128 is turned on. Only when this is sensed by said sensing member 140 it will be determined by the device 141 evaluating these voltage pulses that the second position is assumed by the maneuver switch and the control unit 106 will control the disconnector 100 to open. Such an appearance of voltage pulses on the input lines to the control unit is the only situation in which the disconnector will be opened.

Thus, the device of said arrangement is configured to turn on one said semiconductor switch 127, 128 at the time for obtaining separation in time of the voltage pulses to be sensed by said sensing member 140. Furthermore, the device is preferably configured to turn the semiconductor switches alternatively on or off a plurality of times and to determine that the second position is assumed only if all voltage pulses sensed by the sensing member are in correspondence with the result of the sensing action expected for said second position of the maneuver switch.

FIG. 11b shows how the on time of the semiconductor switches are shortened with respect to that shown in FIG. 11a, such as for being 5-20 ms, resulting in a reduction of power consumption, but the time for an entire cycle of consecutively turning both semiconducting switches 127, 128 on is the same in both cases and is typically in the order of 50 ms-200 ms.

The device may prolong the time distance between turning the semiconductor switches on when the voltage pulses sensed have shown the same of said first and second positions of the maneuver switch during a predetermined period of time, and this is shown in FIG. 11c and results in a further reduction of the current consumption, but then at the cost of a prolonged reaction time. The cycling time may for instance be prolonged from 50-200 ms to 500-1 000 ms when the same position has been sensed during for instance 72 hours. As soon as a change of position has been detected it will then be returned to the cycling time of FIGS. 11a and 11b.

An arrangement according to another embodiment of the invention is shown with a maneuver switch 108 in the first position (FIG. 12) of controlling the disconnector 100 to be closed and a second position (FIG. 13) of controlling the disconnector to be open. This arrangement differs from the one shown in FIG. 10 by having two first resistors 130, 131 arranged in a separate of the output lines 112, 113 from the maneuver switch and having different resistances. Furthermore, it is in this embodiment important that the two second resistors 122, 123 arranged in a separate of the input lines 116, 117 to the control unit 106 have here different resistances, which is not necessary but may have a positive influence upon the current consumption. The arrangement of this embodiment has no semiconductor switches and the control unit has here analogue inputs instead of digital inputs as in the embodiment shown in FIG. 10. The sensing member 140 is in this embodiment configured to sense the voltage on each input line 116, 117 and said device 141 to evaluate the result of the sensing action for determining which of said first and second position is assumed by the maneuver switch 108. By said differences in resistances the voltages on the two input lines 116, 117 will be different for the output line 112 connected to the input line 116 and the output line 112 connected to the input line 117 and for the output line 113 connected to the input line 117 and the output line 113 connected to the input line 116. Furthermore, the differences of the voltages on the two input lines are here differently large for the two different positions of the maneuver switch 108. This means that by sensing the voltage levels of the input lines it may be reliably determined whether the maneuver switch is in an open position as shown in FIG. 13 or faults of broken circuits including the output and input lines occur, so that it may be ensured that the disconnector 100 is not unintentionally opened.

Figure 12:
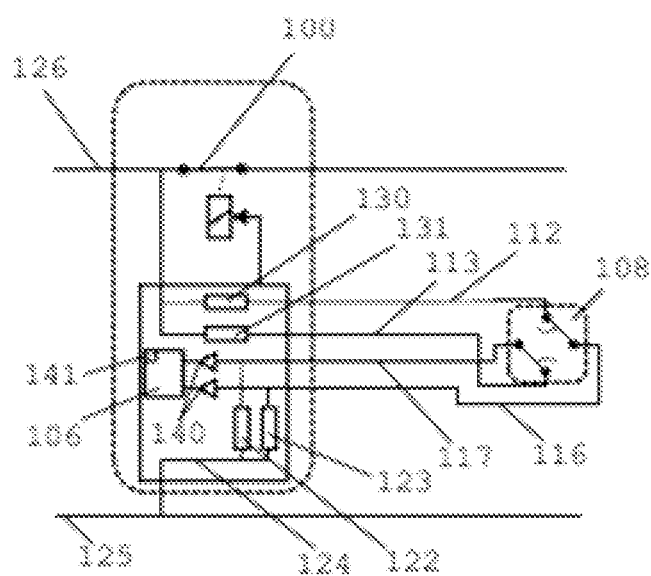
FIG. 12 is a view corresponding to FIG. 10 of an arrangement according to another embodiment of the invention with the maneuver switch in closed state.

FIG. 14 illustrates how the determination of which of the first and second position is assumed by the maneuver switch is carried out, in which the voltage U on the input lines are marked for the maneuver switch in the first position shown in FIG. 12 to the left and in the second position shown in FIG. 13 to the right. The voltage on the input line 116 is indicated by an A and the voltage on the input line 117 is indicated by a B. Thus, only if voltages having the levels and mutual distances shown to the right are sensed the control unit 106 will control the disconnector 100 to open.

FIGS. 7-9 show how two maneuver switches 108, 138 may be connected in series in an arrangement according to an embodiment of the invention, and these are in the position shown in FIG. 7 both in the closed state resulting in a closed disconnector 100, but when one of them is in the open state, as for the maneuver switch 138 in FIG. 8, or both are in that position as in FIG. 9, the disconnector will be in the open state. Such an order given by one of the maneuver switches to the control unit for the control of the disconnector may then be reliably determined by having a sensing member and a device according to FIG. 10 or FIG. 12 included in the arrangement. It is of course possible to have more than two maneuver switches connected in series would that be desired so as to open the disconnector by transferring one of the maneuver switches to the open state.

Figure 10:
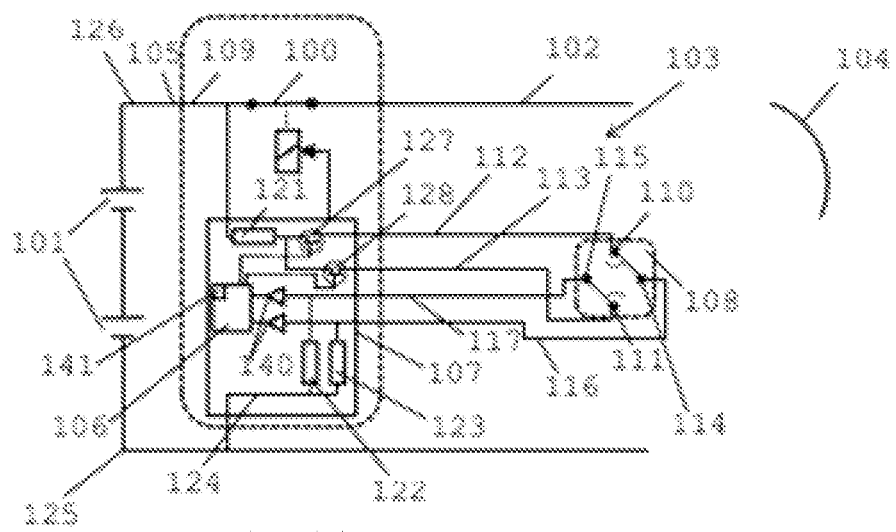
FIG. 10 is a more detailed view of an arrangement according to an embodiment of the invention having the maneuver switch in a closed state.
Figure 15:
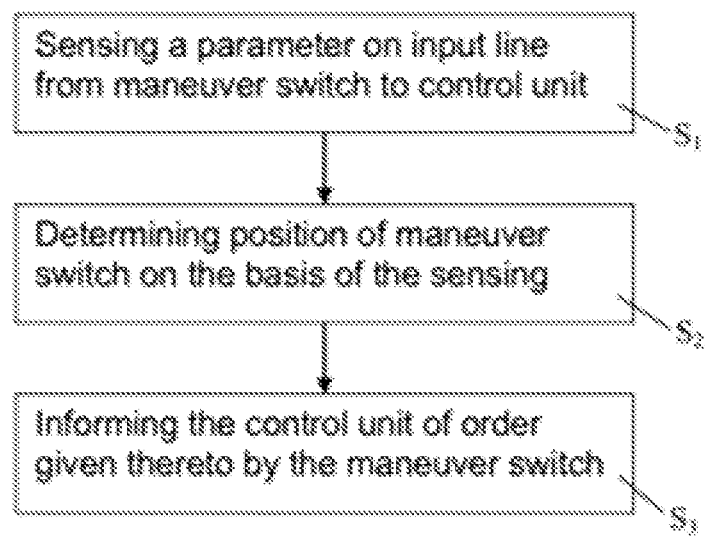
FIG. 15 is a flow chart illustrating the steps carried out in a method according to the invention.

FIG. 15 illustrates a flow chart of a method according to an embodiment of the present invention carried out for an arrangement of the type shown in FIG. 10 or FIG. 12. The method is started with a step $S_1$ of sensing at least one parameter on at least one input line from maneuver switch to control unit followed by a step $S_2$ of determining position of maneuver switch on the basis of the sensing action. Finally, a step $S_3$ includes informing the control unit of order given thereto by the maneuver switch.

A method according to another embodiment of the invention comprises that in step $S_1$ at least one said parameter on each said input line (116, 117) is sensed, and it is in step $S_2$ determined that said second position is assumed by the maneuver switch (108, 138) under the condition that all parameters sensed are in correspondence with a result of the sensing action expected for said second position of the maneuver switch.

Figure 16:
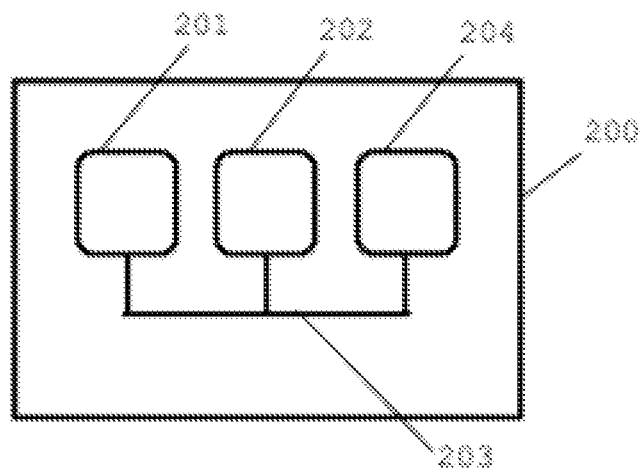
FIG. 16 illustrates schematically an electronic control unit according to the invention.

Computer program code for implementing a method according to the invention is with advantage included in a computer program which can be read into the internal memory of a computer, e.g. the internal memory of an electronic control unit of a motor vehicle. Such a computer program is with advantage provided via a computer program product comprising a data storage medium which can be read by a computer and which has the computer program stored on it. Said data storage medium is for example an optical data storage medium in the form of a CD ROM disc, a DVD disc etc., a magnetic data storage medium in the form of a hard disc, a diskette, a cassette tape etc., or a flash memory or a memory of the ROM, PROM, EPROM or EEPROM type. FIG. 16 illustrates very schematically an electronic control unit 200 comprising an execution means 201, e.g. a central processor unit (CPU), for execution of computer software. The execution means 201 communicates with a memory 202, e.g. of the RAM type, via a data bus 203. The control unit 200 comprises also a non-transitory data storage medium 204, e.g. in the form of a flash memory or a memory of the ROM, PROM, EPROM or EEPROM type. The execution means 201 communicates with the data storage medium 204 via the data bus 203. A computer program comprising computer program code for implementing a method according to the invention, e.g. in accordance with the embodiment illustrated in FIG. 15 is stored on the data storage medium 204.

The invention is of course not in any way restricted to the embodiments described above, since many possibilities for modifications thereof are likely to be obvious to one skilled in the art without having to deviate from the scope of the invention defined in the appended claims.

The device may be configured to send an alarm signal if the result of the sensing action deviates from an expected result for both said first and second position of the maneuver switch. The driver and/or maintenance workers will then be made aware of the presence of faults in this part of the electric system of the motor vehicle.

The invention claimed is:

1. An arrangement for controlling a disconnector electrically arranged between power batteries and a consumer side of an electric system of a motor vehicle, in which the electric system comprises at least one power battery, the disconnector, and a control unit configured to control the disconnector to thereby close or open said conducting line via the disconnector, wherein the arrangement comprises:
   at least one maneuver switch configured to be manually operated and configured to connect said control unit to said conducting line on a battery side of the disconnector, said maneuver switch comprising:
      two fixed output contacts each configured to be connected through an output line to said conducting line on the battery side of the disconnector;
      two fixed input contacts each configured to be connected through an input line to said control unit; and
      two movable contact members movable between a first position for sending a disconnector closing order to the control unit and a second position for sending a disconnector opening order to the control unit,
      wherein the maneuver switch is configured to, in said first position, via said movable contact members, connect each fixed output contact to a different of said respective two fixed input contacts than in the second position;
   a sensing member configured to sense at least one parameter on at least one of said input lines from said maneuver switch to the control unit; and
   a device configured to, based on an output from the sensing member, determine which of said first and second positions is assumed by the maneuver switch and output the determined position of the maneuver switch to the control unit.

2. The arrangement according to claim 1, wherein said sensing member is configured to sense at least one said parameter on each said input line, and said device is configured to determine that said second position is assumed by the maneuver switch.

3. The arrangement according to claim 1, wherein said device is configured to send an alarm signal if the result of the sensing action by said sensing member deviates from an expected result for both said first and second positions of the maneuver switch.

4. The arrangement according to claim 1 further comprising at least one first resistor located in said output lines and connected through said conducting line to a first pole of the power battery so as to act as a current limiter.

5. The arrangement according to claim 1 further comprising at least one second resistor located in a conducting line connecting said input lines to a second pole of the power battery opposite to said first pole.

6. The arrangement according to claim 1 further comprising a normally-off semiconductor switch located in each said output line, and that said device is configured to control the semiconductor switches to be temporarily turned on to, by the sensing member, sense the voltage pulses resulting thereby on the input lines and evaluate the result of this sensing action to determine which of said first and second position is assumed by the maneuver switch.

7. The arrangement according to claim 6, wherein said device is configured to turn on one said semiconductor switch at a time for obtaining separation in time of said voltage pulses to be sensed.

8. The arrangement according to claim 7, wherein said device is configured to turn the semiconductor switches alternatively on and off a plurality of times and to determine that said second position is assumed only if all voltage pulses so sensed by said sensing member are in correspondence with a result of the sensing action expected for said second position of the maneuver switch.

9. The arrangement according to claim 8, wherein said device is configured to prolong the time distance between turning the semiconductor switches on, when the voltage pulses sensed have shown the same of said first and second positions of the maneuver switch during a predetermined period of time.

10. The arrangement according to claim 1 further comprising:
two first resistors located in separate output lines and each connected through said conducting line to a first pole of the power battery so as to act as a current limiter, wherein each first resistor has a different resistance; and
two second resistors located in separate input lines connecting said respective input lines to a second pole of the power battery opposite to said first pole, and
wherein said sensing member is configured to sense the voltage on each said input line and the device to evaluate the result of this sensing action for determining which of said first and second position is assumed by the maneuver switch.

11. The arrangement according to claim 1, wherein said movable contact members have an arc-like shape and are secured to a body to be rotated for making each contact member, bridging a space between different two said fixed input and output contacts, arranged along a circle-like path for moving the maneuver switch between said two positions.

12. The arrangement according to claim 11, wherein every second fixed output contact along said path is connected to a said output line and every second fixed input contact is connected to a said input line.

13. A method for controlling a disconnector electrically arranged between power batteries and a consumer side of an electric system of a motor vehicle, in which the electric system comprises at least one power battery, said disconnector, a control unit configured to control the disconnector to thereby close or open said conducting line via the disconnector and a maneuver switch configured to be manually operated and configured to connect said control unit to said conducting line on a battery side of the disconnector, in which the maneuver switch comprises two fixed output contacts each configured to be connected through an output line to said conducting line on the battery side of the disconnector, two fixed input contacts each configured to be connected to an input line to a said control unit and two movable contact members movable between a first position for sending a disconnector closing order to the control unit and a second position for sending a disconnector opening order to the control unit, and wherein maneuver switch is configured to, in said first position by said movable contact members, connect each fixed output contact to a different of said two fixed input contacts than in the second position, and
wherein the method comprises:
a) sensing at least one parameter on at least one of said input lines from said maneuver switch to the control unit;
b) determining which of said first and second position is assumed by the maneuver switch on the basis of the result of said sensing; and
c) informing the control unit of the order given thereto by the maneuver switch.

14. The method according to claim 13, wherein in step a) at least one said parameter on each said input line is sensed, and in step b) determined that said second position is assumed by the maneuver switch under the condition that all parameters sensed are in correspondence with a result of the sensing action expected for said second position of the maneuver switch.

15. A computer program product comprising computer program code stored on a non-transitory computer-readable medium, said computer program product used for controlling a disconnector electrically arranged between power batteries and a consumer side of an electric system of a motor vehicle, in which the electric system comprises at least one power battery, said disconnector, a control unit configured to control the disconnector to thereby close or open said conducting line via the disconnector and a maneuver switch configured to be manually operated and configured to connect said control unit to said conducting line on a battery side of the disconnector, in which the maneuver switch comprises two fixed output contacts each configured to be connected through an output line to said conducting line on the battery side of the disconnector, two fixed input contacts each configured to be connected to an input line to a said control unit and two movable contact members movable between a first position for sending a disconnector closing order to the control unit and a second position for sending a disconnector opening order to the control unit, and wherein maneuver switch is configured to, in said first position by said movable contact members, connect each fixed output contact to a different of said two fixed input contacts than in the second position, said computer program code comprising computer instructions to cause one or more control units to perform the following operations:
a) sensing at least one parameter on at least one of said input lines from said maneuver switch to the control unit;
b) determining which of said first and second position is assumed by the maneuver switch on the basis of the result of said sensing; and
c) informing the control unit of the order given thereto by the maneuver switch.

16. An electronic control unit of a motor vehicle, said electronic control unit comprised in an arrangement for controlling a disconnector electrically arranged between power batteries and a consumer side of an electric system of a motor vehicle, in which the electric system comprises at least one power battery, the disconnector, and the electronic control unit, where the electronic control unit is configured to control the disconnector to thereby close or open said conducting line via the disconnector, wherein the arrangement comprises:
at least one maneuver switch configured to be manually operated and configured to connect said electronic control unit to said conducting line on a battery side of the disconnector, said maneuver switch comprising:

two fixed output contacts each configured to be connected through an output line to said conducting line on the battery side of the disconnector;
two fixed input contacts each configured to be connected through an input line to said electronic control unit; and
two movable contact members movable between a first position for sending a disconnector closing order to the electronic control unit and a second position for sending a disconnector opening order to the electronic control unit,
wherein the maneuver switch is configured to, in said first position, via said movable contact members, connect each fixed output contact to a different of said respective two fixed input contacts than in the second position;
a sensing member configured to sense at least one parameter on at least one of said input lines from said maneuver switch to the electronic control unit; and
a device configured to, based on an output from the sensing member, determine which of said first and second positions is assumed by the maneuver switch and output the determined position of the maneuver switch to the electronic control unit.

17. A motor vehicle an arrangement for controlling a disconnector electrically arranged between power batteries and a consumer side of an electric system of a motor vehicle, in which the electric system comprises at least one power battery, the disconnector, and a control unit configured to control the disconnector to thereby close or open said conducting line via the disconnector, wherein the arrangement comprises:
at least one maneuver switch configured to be manually operated and configured to connect said control unit to said conducting line on a battery side of the disconnector, said maneuver switch comprising:
two fixed output contacts each configured to be connected through an output line to said conducting line on the battery side of the disconnector;
two fixed input contacts each configured to be connected through an input line to said control unit; and
two movable contact members movable between a first position for sending a disconnector closing order to the control unit and a second position for sending a disconnector opening order to the control unit,
wherein the maneuver switch is configured to, in said first position, via said movable contact members, connect each fixed output contact to a different of said respective two fixed input contacts than in the second position;
a sensing member configured to sense at least one parameter on at least one of said input lines from said maneuver switch to the control unit; and
a device configured to, based on an output from the sensing member, determine which of said first and second positions is assumed by the maneuver switch and output the determined position of the maneuver switch to the control unit.

* * * * *